United States Patent
King et al.

(10) Patent No.: US 10,691,286 B2
(45) Date of Patent: Jun. 23, 2020

(54) DYNAMIC GRAPHICAL INTERFACE SHADOWS

(71) Applicant: Apple Inc., Cupertino, CA (US)

(72) Inventors: Nicholas V. King, San Jose, CA (US); Duncan Robert Kerr, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 15/136,749

(22) Filed: Apr. 22, 2016

(65) Prior Publication Data
US 2016/0239180 A1  Aug. 18, 2016

Related U.S. Application Data (63) Continuation of application No. 13/306,803, filed on Nov. 29, 2011, now Pat. No. 9,324,183.

(51) Int. Cl.
*G06F 3/0481* (2013.01)
*G06T 15/60* (2006.01)
*G06F 3/0484* (2013.01)

(52) U.S. Cl.
CPC ...... *G06F 3/04812* (2013.01); *G06F 3/04842* (2013.01); *G06T 15/60* (2013.01); *G06T 2200/24* (2013.01)

(58) Field of Classification Search
None
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,742,749 A | 4/1998 | Fornan et al. |
| 5,825,352 A | 10/1998 | Bisset et al. |
| 5,835,079 A | 11/1998 | Shieh |
| 5,880,411 A | 3/1999 | Gillespie et al. |
| 5,880,733 A | 3/1999 | Horvitz et al. |

(Continued)

FOREIGN PATENT DOCUMENTS

| | | |
|---|---|---|
| GB | 2 238 215 A | 5/1991 |
| JP | 2000-163031 A | 6/2000 |

(Continued)

OTHER PUBLICATIONS

Anonymous. (2011). Stardock CursorFX Settings, *Stardock*, located at http://www.stardock.com/products/cursorfx/help/settings/html, last visited on Sep. 19, 2011, six pages.

(Continued)

*Primary Examiner* — Steven Z Elbinger
(74) *Attorney, Agent, or Firm* — Kubota & Basol LLP (57) ABSTRACT

Dynamic window and cursor shadows are described. In some implementations, graphical user interface display objects can be configured with elevation offset information to give the display objects a three-dimensional surface that can have pixels of varying height. In some implementations, shadows that are rendered upon display objects configured with pixel elevation offset information can be adjusted to reflect the three-dimensional surface of the objects thereby better approximating real-life shadows. In some implementations, shadows can be dynamically rendered in real-time and adjusted according to the elevations of display objects onto which they are cast.

27 Claims, 9 Drawing Sheets

(56) References Cited

U.S. PATENT DOCUMENTS

| | | | |
|---|---|---|---|
| 6,023,275 A * | 2/2000 | Horvitz | G06F 3/04815 715/700 |
| 6,166,718 A | 12/2000 | Takeda | |
| 6,188,391 B1 | 2/2001 | Seely et al. | |
| 6,310,610 B1 | 10/2001 | Beaton et al. | |
| 6,313,836 B1 | 11/2001 | Russell, Jr. et al. | |
| 6,323,846 B1 | 11/2001 | Westerman et al. | |
| 6,590,573 B1 | 7/2003 | Geshwind | |
| 6,642,947 B2 | 11/2003 | Feierbach | |
| 6,690,387 B2 | 2/2004 | Zimmerman et al. | |
| 6,903,741 B2 | 6/2005 | Corbetta | |
| 6,971,071 B1 | 11/2005 | Impas et al. | |
| 7,000,180 B2 | 2/2006 | Balthaser | |
| 7,015,894 B2 | 3/2006 | Morohoshi | |
| 7,184,064 B2 | 2/2007 | Zimmerman et al. | |
| 7,439,975 B2 * | 10/2008 | Hsu | G06T 15/60 345/426 |
| 7,663,607 B2 | 2/2010 | Hotelling et al. | |
| 7,675,518 B1 | 3/2010 | Miller | |
| 7,975,241 B2 | 7/2011 | Rosen et al. | |
| 8,479,122 B2 | 7/2013 | Hotelling et al. | |
| 9,324,183 B2 | 4/2016 | King et al. | |
| 9,372,593 B2 | 6/2016 | King et al. | |
| 2002/0018063 A1 | 2/2002 | Donovan et al. | |
| 2002/0022517 A1 * | 2/2002 | Tokuyama | A63F 13/10 463/32 |
| 2003/0058241 A1 | 3/2003 | Hsu | |
| 2004/0237053 A1 | 11/2004 | Impas et al. | |
| 2006/0026521 A1 | 2/2006 | Hotelling et al. | |
| 2006/0197753 A1 | 9/2006 | Hotelling | |
| 2007/0261007 A1 * | 11/2007 | Hutcheson | G06F 3/0482 715/853 |
| 2008/0288895 A1 | 11/2008 | Hollemans et al. | |
| 2009/0083628 A1 | 3/2009 | Fitzmaurice et al. | |
| 2009/0109244 A1 | 4/2009 | Conner et al. | |
| 2009/0140978 A1 | 6/2009 | Louch | |
| 2010/0083165 A1 | 4/2010 | Andrews et al. | |
| 2011/0016417 A1 * | 1/2011 | Shiplacoff | G06F 3/0483 715/768 |
| 2011/0167353 A1 | 7/2011 | Grosz et al. | |
| 2011/0225538 A1 | 9/2011 | Oyagi et al. | |
| 2011/0289461 A1 | 11/2011 | Jancourtz | |
| 2012/0007857 A1 * | 1/2012 | Noda | G06F 3/04812 345/419 |
| 2012/0038745 A1 * | 2/2012 | Yu | G06T 15/08 348/46 |
| 2012/0157203 A1 | 6/2012 | Latta et al. | |
| 2012/0218395 A1 * | 8/2012 | Andersen | G06F 3/017 348/77 |
| 2013/0135288 A1 | 5/2013 | King et al. | |
| 2013/0135309 A1 | 5/2013 | King et al. | |

FOREIGN PATENT DOCUMENTS

| | | |
|---|---|---|
| JP | 2002-342033 A | 11/2002 |
| KR | 10-2004-0087425 A | 10/2004 |
| KR | 10-0454070 B1 | 10/2004 |
| KR | 10-0898990 B1 | 5/2009 |
| WO | WO-2010/015807 A1 | 2/2010 |

OTHER PUBLICATIONS

CN Search Report completed Mar. 26, 2015, for CN Patent Application No. 201210473228.3, filed Sep. 28, 2012, two pages.

Final Office Action dated Dec. 30, 2013, for U.S. Appl. No. 13/306,831, filed Nov. 29, 2011, 16 pages.

Final Office Action dated Mar. 7, 2014, for U.S. Appl. No. 13,306,803, filed Nov. 29, 2011, 14 pages.

Final Office Action dated Nov. 18, 2014, for U.S. Appl. No. 13/306,831, filed Nov. 29, 2011, 14 pages.

Final Office Action dated May 22, 2015, for U.S. Appl. No. 13/306,803, filed Nov. 29, 2011, nine pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Aug. 7, 2013, for U.S. Appl. No. 13/306,831, filed Nov. 29, 2011, 13 pages.

Non-Final Office Action dated Jul. 18, 2013, for U.S. Appl. No. 13/306,803, filed Nov. 29, 2011, 16 pages.

Non-Final Office Action dated May 29, 2014, for U.S. Appl. No. 13/306,831, filed Nov. 29, 2011, 15 pages.

Non-Final Office Action dated Nov. 10, 2014, for U.S. Appl. No. 13/306,803, filed Nov. 29, 2011, 14 pages.

Non-Final Office Action dated Jun. 24, 2015, for U.S. Appl. No. 13/306,831, filed Nov. 29, 2011, 15 pages.

Notice of Allowance dated Nov. 27, 2015, for U.S. Appl. No. 13/306,803, filed Nov. 29, 2011, eight pages.

Notice of Allowance dated Feb. 19, 2016, for U.S. Appl. No. 13/306,831, filed Nov. 29, 2011, ten pages.

Notice of Allowance (corrected) dated Mar. 31, 2016, for U.S. Appl. No. 13/306,803, filed Nov. 29, 2011, two pages.

Plenacoste et al. (1998). "The Role of Static and Dynamic Shadows in a Three-Dimensional Computer Environment," *Proceedings of WebNet 98—World Conference on the WWW and Internet & Intranet*, five pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," *CHI '92*, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

European Search Report dated Aug. 22, 2017, for EP Patent Application No. 12186334.4, filed Sep. 27, 2012, six pages.

European Search Report dated May 18, 2017, for EP Patent Application No. 12186334.4, filed Sep. 27, 2012, thirteen pages.

Liu et al., "Shadow Mapping Algorithms: A Complete Survey", International Symposium on Computer Network and Multimedia Technology, Jan. 18, 2009, pp. 1-5.

Office Action received for Korean Patent Application No. 10-2016-0081062, dated Apr. 24, 2019, 7 pages (3 pages of English Translation and 4 pages of Official Copy).

Summons to Attend Oral Proceedings received for European Patent Application No. 12186334.4, mailed on Jan. 27, 2020, 13 pages.

* cited by examiner

DYNAMIC GRAPHICAL INTERFACE SHADOWS

CROSS REFERENCE TO RELATED APPLICATIONS

This application is a continuation of U.S. patent application Ser. No. 13/306,803, filed Nov. 29, 2011 and published on May 30, 2013 as U.S. Publication No. 2013/0135309, the contents of which are incorporated by reference herein in their entirety for all intended purposes.

TECHNICAL FIELD

The disclosure generally relates to graphical user interfaces and rendering three-dimensional effects.

BACKGROUND

Graphical user interfaces often employ shadowing techniques to provide the illusion of depth on a two-dimensional surface. Often graphical user interfaces use a shadow having predefined characteristics, such as a predefined size or a predefined distance from the object which cast the shadow or to which the shadow is associated. While these techniques can provide an illusion of depth, these static shadows do not adjust with the contours of graphical user interface objects and therefore do not provide a natural or realistic look and feel.

SUMMARY

Dynamic graphical interface shadows are described. In some implementations, graphical user interface display objects can be configured with elevation offset information to give the display objects a three-dimensional surface that can have pixels of varying height. In some implementations, shadows that are rendered upon display objects configured with pixel elevation offset information can be adjusted to reflect the three-dimensional surface of the objects thereby better approximating real-life shadows. In some implementations, shadows can be dynamically rendered in real-time and adjusted according to the elevations of display objects onto which they are cast.

Particular implementations provide at least the following advantages: Shadows can appear more lifelike and better convey the relative positions of user interface elements. Per-pixel elevation maps allow for modeling of complex textures and surfaces. Dynamic shadows can be implemented as a graphical processing unit (GPU) filter allowing for hardware acceleration. Otherwise flat graphical user interface elements can be configured to have three-dimensional surfaces that vary in height. Shadows rendered upon the three-dimensional surfaces can be distorted according to the three-dimensional surface.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Modern computer displays and graphical interfaces often try to simulate real life three-dimensional objects and spaces. Often, three-dimensional simulation is achieved through the use of shadows to give the appearance of depth on in a two-dimensional image. Also, the arrangement of objects on a two-dimensional graphical interface can be used to suggest depth and/or layering of the objects. For example, the desktop metaphor is commonly used on computer displays to arrange and display windows, files, images, icons and other objects. Objects on the desktop can overlap (e.g., overlapping windows) or obscure other objects (e.g., windows positioned over desktop icons can hide or obscure the icons). The overlapping and obscuring of objects can suggest a layering of objects or a depth or elevation associated with each object. For example, layering can suggest to the user that the objects on the desktop are stacked on top of each other so that each object is positioned at a different elevation off of the desktop. The elevation (e.g., height or depth) of the object with respect to the desktop (or screen, or user) can suggest a third dimension. Thus, the graphical user interface can be said to have a horizontal dimension along an X-axis, a vertical dimension along a Y-axis and an elevation dimension along a Z-axis (e.g., the Z-axis being perpendicular to the desktop and display screen) and display objects can be positioned according to X, Y and Z coordinates within the display area.

In some implementations, the elevation of objects (e.g., the elevation of windows, icons, cursors, user interface elements, etc.) can be used to adjust object shadows to provide more realistic and dynamically adjusted shadows. In some implementations, pixels of a graphical user interface (e.g., pixels of display objects, graphical elements, etc.) can be configured with an elevation offset to generate user interface elements with contoured surfaces of varying elevation. For example, a pixel elevation offset can be an elevation value that is added to (or subtracted from) a display object's elevation to give the display object a contoured surface. In some implementations, the pixel elevation offset can be used to generate shadows that adapt to the contoured surfaces of the graphical user interface objects and elements.

Figure 1:
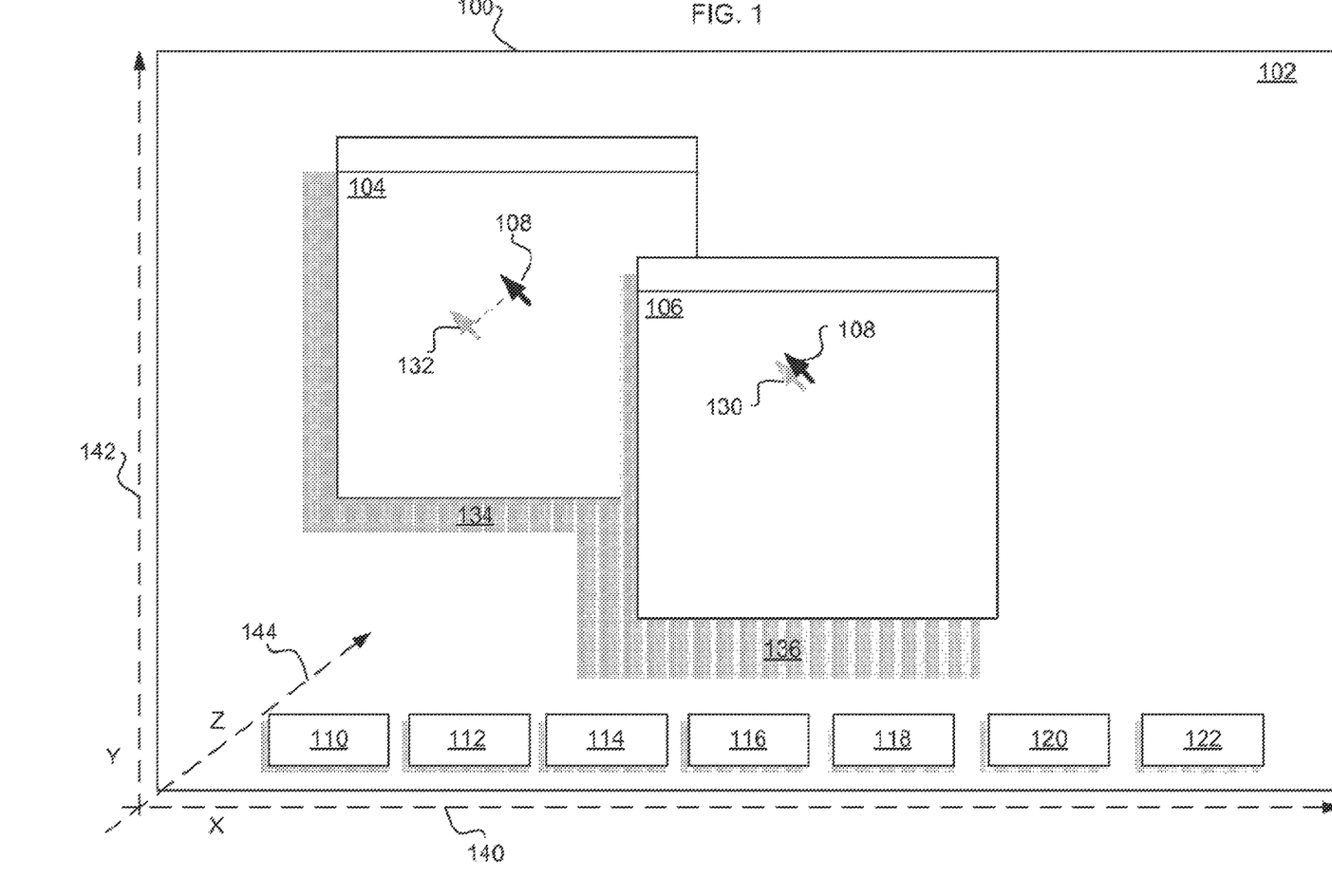
FIG. 1 illustrates an example graphical user interface having dynamic shadows.

FIG. 1 illustrates an example graphical user interface (GUI) 100 having dynamic shadows. GUI 100 is a user interface that can be presented on a display of a computing device (e.g., desktop computer, tablet computer, smartphone, laptop computer, etc.). GUI 100 can include a desktop graphical interface ("desktop") 102. For example, desktop graphical interface 102 can present a desktop metaphor that can be used to provide user access to applications, documents and files on the computing device. GUI 100 can include window 104 and window 106. For example, windows 104 and 106 can be application windows for presenting user interfaces of various applications of the computing device. In some implementations, windows 104 and 106 can be arranged and/or layered at different elevations. For example, desktop 102 can have an elevation of zero, window 104 can have an elevation of ten (10) and window 106 can have an elevation of twenty (20). In some implementations, the elevations of the windows can be determined dynamically as the windows are moved about or rearranged by a user. For example, a user can select a window 104 to cause window 104 to become the top-most window. Other windows (e.g., window 106) can be arranged beneath (e.g., at a lower elevation) window 104 when window 104 is selected.

In some implementations, the elevation of objects can be determined based on an order assigned to the objects by the computing device. For example, the computing device can maintain a list or array of objects displayed on GUI 100. Each window, icon, cursor, or other object can occupy a position in the array. The display position (e.g., elevation, layer, elevation, etc.) of the graphical objects can correspond to the position (e.g., index) of the object in the array. For example, an object occupying the first position in the array can be displayed on top (e.g., having the highest elevation), an object occupying the second position in the array can be displayed beneath the first, and so on. When an object from the middle of the array is selected (e.g., a displayed window is selected by a user and becomes the current working window), the selected object can be moved to the first position in the array and the other objects in the array can shift positions. GUI 100 can be updated to reflect the adjusted order of the display objects in the array (e.g., the selected window will gain elevation to become the top most window in GUI 100). Thus, the graphical objects can be displayed at elevations on GUI 100 that reflect the objects' relative positions in the array.

GUI 100 can include a cursor 108. For example, cursor 108 can be employed by a user to interact with GUI 100, desktop 102, windows 104 and 106, icons 110-122 and/or any other object displayed on GUI 100. A user can manipulate cursor 108 to select window 104 and cause window 104 to become the top-most window, for example. Cursor 108 can be associated with an elevation. For example, cursor 108 can have the highest elevation of any object displayed in GUI 100 so that cursor 108 is always on top of other graphical objects. Thus, if desktop 102 has an elevation of zero, window 104 has an elevation of ten (10) and window 106 has an elevation of twenty (20), cursor 108 can have an elevation of thirty (30), for example.

In some implementations, graphical user interface objects (e.g., windows 104 and 106, cursor 108, icons 110-122) can cast shadows based on the objects' respective positions (including elevation) and the position (e.g., angle) of a simulated or detected light source. For example, each object on GUI 100 can have a horizontal position (e.g., along X-axis 140), a vertical position (e.g., along Y-axis 142) and an elevation (e.g., along Z-axis 144). The location of the shadow generated for an object can be adjusted according to the location of the light source and the difference in elevation between the object casting the shadow (e.g., the occluding object) and the object onto which the shadow falls (e.g., the occluded object). Moreover, the size, blur radius and opacity of an object's shadow can be adjusted based on how far the shadow drops from the object casting the shadow.

In some implementations, cursor 108 can have a corresponding drop shadow 130 or 132. For example, as cursor 108 is moved about GUI 100, a shadow (e.g., shadow 130 or 132) can follow the cursor to make it appear as if the cursor is floating above the desktop. In some implementations, the size and location of the shadow 130, 132 can be adjusted based on the elevation of the cursor and the elevation of the object onto which the shadow is cast. For example, if cursor 108 is over window 106, the size and location of shadow 130 can be adjusted based on the difference between the elevation of cursor 108 and the elevation of window 106. In this example, the difference in the elevations of cursor 108 and window 106 is small, thus shadow 130 is located close to cursor 108 and the shadow would have about the same size as the cursor. In contrast, the elevation of window 104 is less than the elevation of window 106, thus the greater elevation difference between window 104 and cursor 108 results in shadow 132 being located farther away from cursor 108. Additionally, the blur radius, opacity and size of shadow 132 can be adjusted to account for the difference in elevation between cursor 108 and window 104 and to provide a more realistic shadow appearance.

In some implementations, a touch screen interface can be used to provide input. For example, a user can touch the touch screen interface with a finger and the point of contact on the touch screen interface can be the cursor location. In some implementations, a display object associated with the touch location can be displayed. For example, a loupe, or other display object, can be displayed proximate to the touch location. In some implementations, the display object associated with the touch location can cast a dynamic shadow. For example, if a loupe is displayed, a shadow associated with the loupe can be generated. In some implementations, a display object may not be displayed for a touch input location. In some implementations, a dynamic shadow can be generated for the area touched on the touch screen interface. For example, when a user touches the touch screen interface with a finger, a dynamic shadow can be generated and displayed based on the area of the touch screen interface touched by the finger. If the area of the touch screen interface that is touched by the finger is an oval area ten pixels wide and twenty pixels high, then a dynamic shadow can be generated based on the size and location of the oval, for example. The oval touch area can cast a dynamic shadow much like a display object (e.g., cursor 108), for example.

Similarly, windows 104 and 106 can drop shadows 134 and 136. For example, shadow 134 can be generated based on the elevation difference between window 104 and desktop 102. In this case, since desktop 102 has an elevation of zero, the elevation of window 104 can be used to generate shadow 134. Shadow 136 can be generated for window 106. However, shadow 136 is cast upon surfaces having two different elevations (e.g., window 104 and desktop 102). For example, the difference in elevation between window 106 and 104 is smaller than the difference in elevation between window 106 and desktop 102. Thus, the portions of shadow 136 that are cast upon window 104 will have different dimensions than the portions of shadow 136 that are cast upon desktop 102. For example, the portions of shadow 136 that are generated upon desktop 102 can appear to be farther away from window 106 than the portion of shadow 136 that are generated upon the nearer surface of window 104. Additionally, the blur radius and opacity of the shadows can be adjusted based on the elevation differences between the windows casting the shadows and the objects upon which the shadows are generated. Other graphical objects, such as icons 110-122, can cast shadows that can be adjusted based on the elevation of the icons as well.

In some implementations, display objects can obscure shadows. For example, if the shadow of cursor 108 should be generated beneath window 106 (e.g., based on the position of cursor 108, the elevation of window 106 and the angle of the light source) then no shadow will be generated for cursor 108 because window 106 will occlude or hide the shadow.

Figure 2:
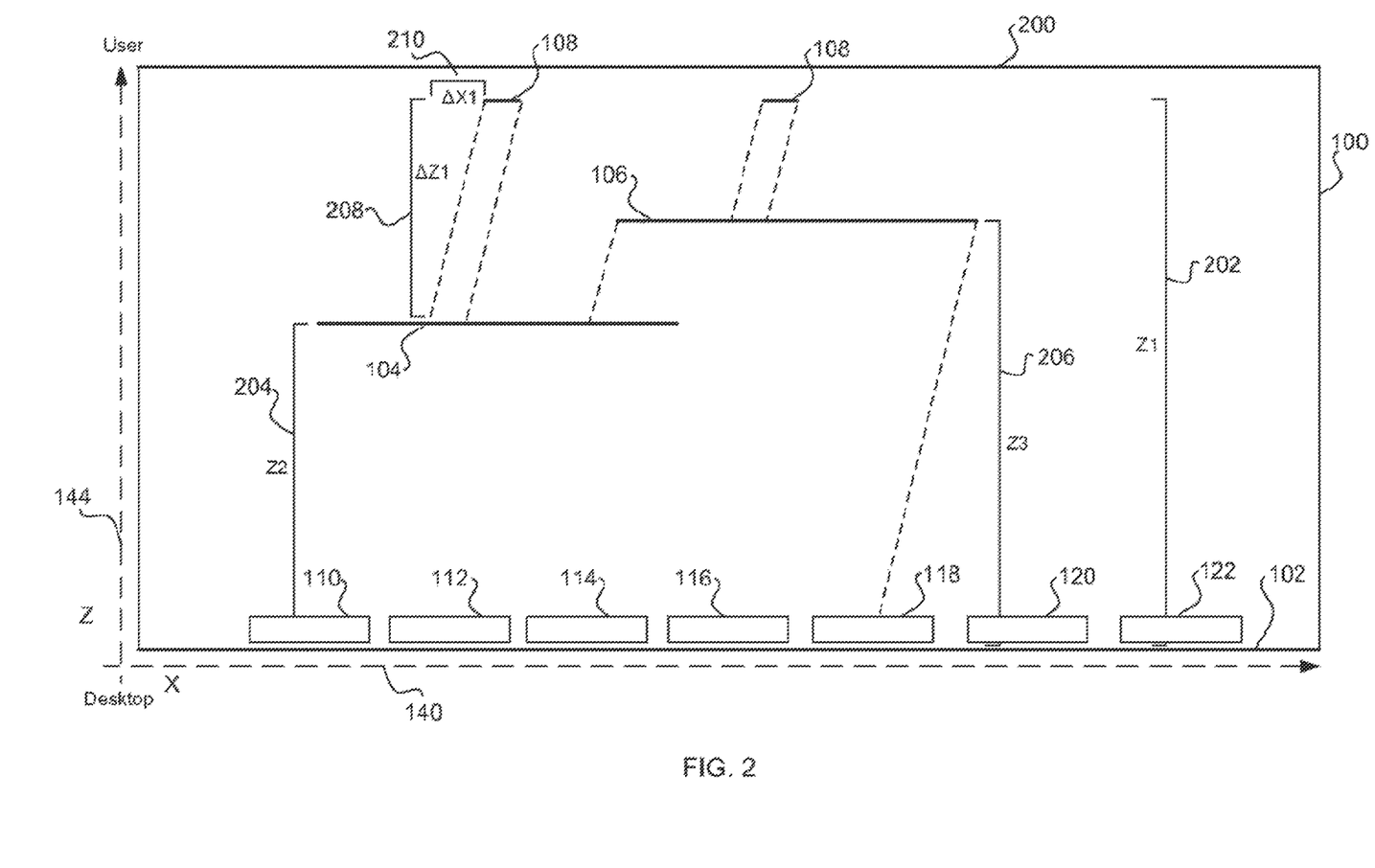
FIG. 2 illustrates an example of the different elevations associated with objects in the graphical user interface of FIG. 1.

FIG. 2 illustrates an example of the different elevations associated with objects in graphical user interface 100. For example, FIG. 2 can represent a side view of GUI 100 including cursor 108, windows 104 and 106, icons 110-122 and desktop 102. In FIG. 2, the elevations (e.g., along Z-axis 144) of the various graphical objects can be clearly seen. For example, desktop 102 can have an elevation of zero and all other graphical objects (e.g., icons 110-122, window 104, window 106, cursor 108, etc.) can have elevations relative to the desktop. Alternatively, the elevations can correspond to depth values representing a distance that each object is from the user or display screen 200 (e.g., where display screen 200 has a depth of zero).

Graphical objects can be arranged at varying elevations (or depths) between the display screen 200 and desktop 102. For example, cursor 108 can have an elevation 'Z1' 202 that places the cursor above all other objects in interface 100 thereby preventing cursor 108 from being obscured by other graphical objects displayed in interface 100. Window 104 can have an elevation 'Z2' 204. Window 106 can have an elevation 'Z3' 206 between window 104 and cursor 108. The icons 110-122 can have associated elevations (or depths) as well.

In some implementations, the elevations assigned to objects can be relative to other objects displayed on user interface 100. For example, cursor 108 can be configured to be displayed at a predetermined elevation 'E' and the elevation of other graphical objects can be determined with respect to E. In some implementations, an elevation differential can be added or subtracted from elevation E to provide spacing between display objects. An elevation differential can be configured to be 5 units (e.g., pixels, millimeters, inches, etc.). The elevation of window 106, for example, can be determined to be 5 units below cursor 108. The elevation of window 104, for example, can be determined to be 10 units below cursor 108 and 5 units below window 106. Thus, where graphical objects are maintained in an array-like data structure where an order of graphical objects is maintained, each object can be displayed according to the elevation differential and the object's position in the array. For example, each display object in the array can be positioned 5 units below a previous display object in the array. In some implementations, the elevations (or depths) can be determined relative to the desktop 102 (e.g., having an elevation of zero) or relative to the screen 200 (e.g., having a depth of zero). In some implementations, the elevation differential can be determined dynamically. For example, if desktop 102 has an elevation of zero (0) and screen 200 has a elevation of fifty (50), then display objects can be evenly spaced between desktop 102 and screen 200 by dividing the screen elevation 50 by the number of displayed objects to determine the elevation differential. Other methods for dynamically determining elevation differentials for display objects can be used.

In some implementations, the elevations of graphical objects can be used to generate object shadows. In some implementations, elevations of graphical objects can be used to determine the location, size, opacity and/or blur radius of shadows associated with display objects. For example, to generate a shadow for cursor 108 over window 104, the elevation difference 'ΔZ1' 208 must be determined. To do so, elevation 'Z2' 204 can be subtracted from elevation 'Z1' 202. Once 'ΔZ1' 208 is calculated, the horizontal offset (e.g., along X-axis 140) of the shadow from cursor 108 can be determined based on the tangent of the angle θ (along the X-axis 140) at which the light source intersects cursor 108 and the calculated value 'ΔZ1' 208 (e.g., ΔX1=ΔZ1/tan(θ)). Vertical shadow offsets (e.g., along Y-axis 142) can be calculated in a similar fashion. In some implementations, the shadow offset can be calculated on a per-pixel basis. For example, each pixel of cursor 108 can cast a corresponding shadow pixel. The location of the shadow pixel can be determined based on the calculated shadow offset. For example, if a pixel of cursor 108 is at horizontal coordinate 'x' and the pixel offset is five (5), then the location of the corresponding shadow pixel can be 'x+5'. Thus, the drop shadow for cursor 108 (and other display objects, windows, icons, etc.) can be generated in real-time based on the size, shape and position of the cursor 108.

In some implementations, the light source can be simulated. For example, a position of the light source and the angle at which the light intersects objects on the screen can be a configured parameter. In some implementations, the light source can be detected. For example, a computing device that is coupled to a camera can use the camera to detect a light source external to the computing device and calculate or derive the location of the external light source relative to the computing device or camera. Thus, as the computing device and/or camera are moved relative to the external light source, the dynamic shadows generated by the computing device for display objects can be adjusted to reflect the change in relative position between the computing device and the external light source.

In some implementations, the size of a shadow can be increased as the elevation differential (e.g., the difference in elevations between the object casting the shadow and the object onto which shadow is cast) increases. For example, for every five (5) pixels in elevation, the size of the shadow can be increased one (1) pixel, by a specified percentage, or other mechanism. In some implementations, the opacity of the shadow can be adjusted based on the elevation differential. For example, for every three (3) pixels in elevation, the opacity of the shadow can be decreased by five percent (5%). In some implementations, the blur radius of the shadow can be adjusted based on the elevation differential. For example, for every ten (10) pixels in elevation, the blur radius can be increased by twenty percent (20%). In some implementations, adjustments to size, opacity and/or blur radius can be applied after the location of the shadow is determined. Other mechanisms can be implemented for adjusting the location, size, opacity and/or blur radius of shadows based on object elevations.

In some implementations, once the elevation of a display object (e.g., window, icons, desktop, etc.) is determined, the determined elevation is assigned to every pixel of the display object. For example, if window 106 has an elevation of forty (40), every pixel of window 106 can be assigned an elevation of forty. If window 104 has an elevation of thirty-five (35), then every pixel of window 104 can be assigned an elevation of thirty-five. Thus, when rendering overlapping windows 104 and 106, if a pixel from window 104 and a pixel from window 106 occupy the same horizontal and vertical location (e.g., X,Y location), the pixel having the largest elevation can be displayed. In this case, the pixel associated with window 106 will be displayed since window 106 has an elevation of 40 while window 104 has an elevation of only 35. In some implementations, assigning the calculated object elevation to every pixel of the object will result in the object having a flat surface (e.g., without contour or texture). Likewise, shadows cast upon these flat objects will also appear to be flat (e.g., without contours, textures, etc.).

Figure 3:
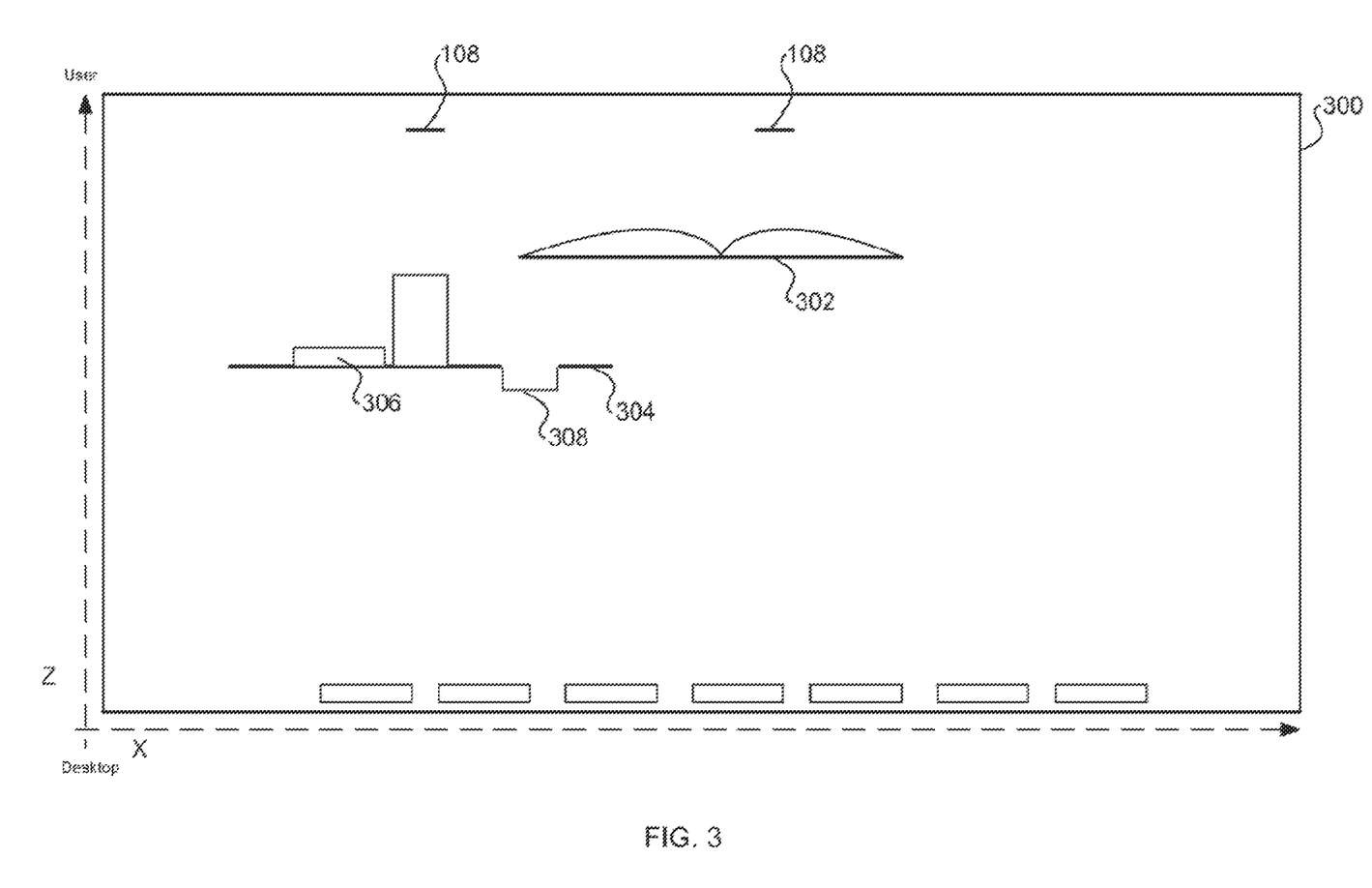
FIG. 3 illustrates an example graphical user interface where graphical elements are configured with pixel elevation offset information.

FIG. 3 illustrates an example graphical user interface 300 where graphical elements are configured with pixel elevation offset information. In some implementations, graphical display objects (e.g., windows, icons, desktops, graphical user interfaces, graphical elements, etc.) can be configured with pixel elevation offset information that associates an elevation offset value with every pixel of a display object. For example, pixel elevation offset information can be an elevation value that can be added to or subtracted from the determined elevation of an object, as described above with respect to FIG. 2. Thus, once an elevation has been determined for an object, the determined elevation can be adjusted based on the preconfigured pixel elevation offset information for the object.

In some implementations, pixel elevation offset information can be configured to provide contours and/or texture to graphical display objects. In some implementations, GUI 300 can include window 302 and window 304 having pixel elevation offset information. For example, window 302 can present a graphical user interface for an electronic book application. The developer of the electronic book application can configure the pixels of window 302 with elevation offset information corresponding to the contours of an open book, as described in greater detail with respect to FIG. 4. In some implementations, window 304 can be configured with pixel offset information to associate graphical elements with different elevations. For example, window 304 can have a raised button 306, where the pixels of button 306 are configured with a positive elevation offset. Window 304 can have a recessed image 308, for example, where the pixels of recessed image 308 are configured with a negative elevation offset. In some implementations, shadows cast upon windows 302 and 304 can be generated taking into account the pixel elevation offset information. Thus, shadows generated upon windows 302 and 304 can have a contoured, textured and/or varied presentation according to the pixel elevation offset information assigned to the pixels of the windows.

Figure 4:
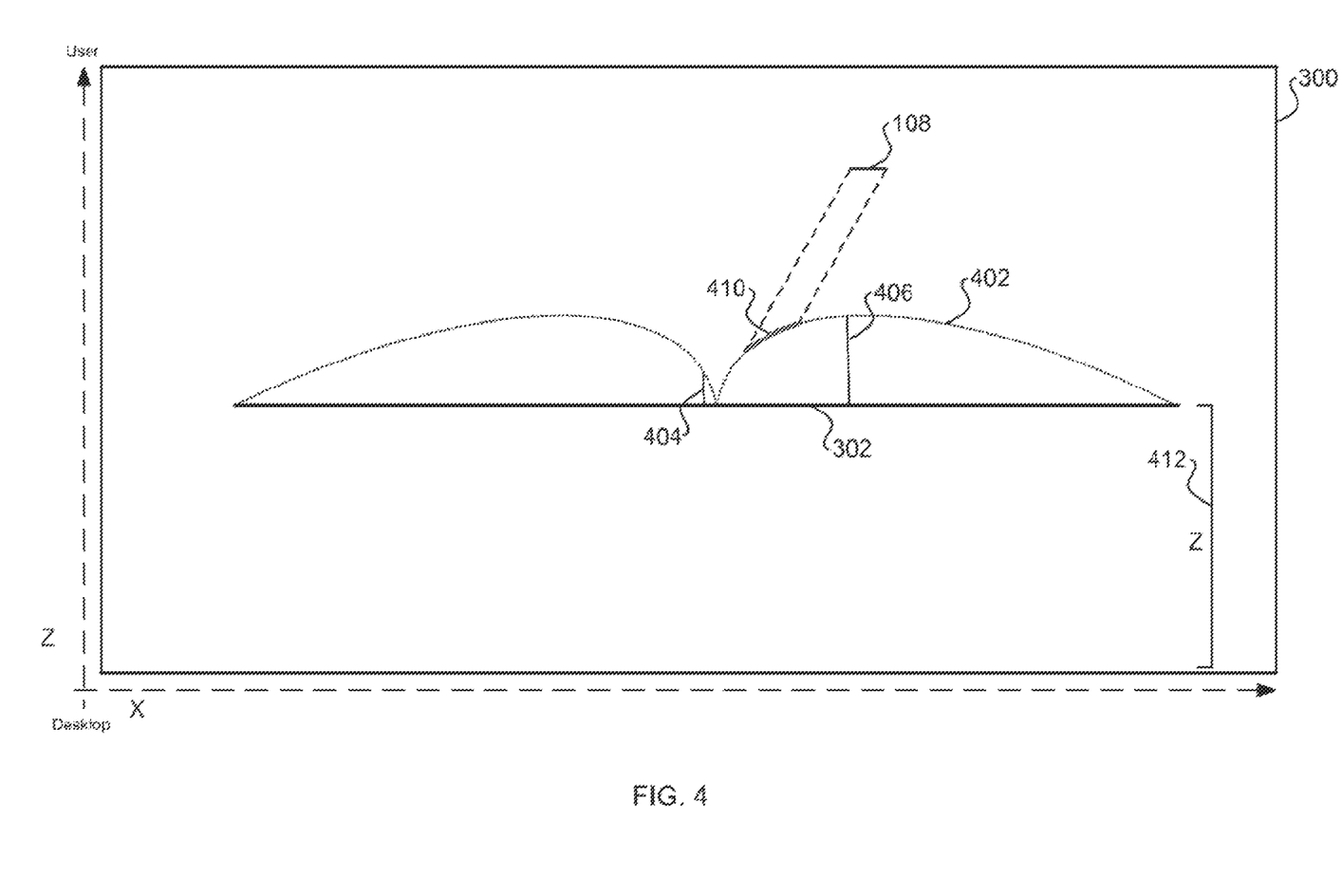
FIG. 4 illustrates an example display object configured with pixel elevation offset information.

FIG. 4 illustrates an example display object 302 configured with pixel elevation offset information. For example, display object 302 can be configured with a contoured surface 402. The contoured surface 402 can be generated by configuring the pixels of display object 302 with elevation offset information. For example, each dot of the dotted line of contoured surface 402 can represent a pixel and a corresponding elevation for the pixel of the display object 302. For example, if display object 302 is a graphical user interface for an electronic book application, each pixel of display object 302 can be configured with elevation offsets that simulate the contours of a physical book. For example, the elevation offsets for the pixels at the side of a page (e.g., at the simulated binding of the book) can have small offsets 404 while the elevation offsets for pixels near the middle of the page can have larger offsets 406. When the electronic book interface is rendered on the screen of a computing device, the pixel elevation offsets can be added (or subtracted) from the elevation 412 determined for display object 302.

In some implementations, the pixel elevation offset information can be used to generate drop shadows. For example, cursor 108 can cast a shadow 410 on display object 302.

Since display object 302 is configured with pixel elevation offset information that simulates the contours of an open book, shadow 410 can be generated to conform to the contours of the book. For example, shadow 410 can be generated based on the elevation determined for display object 302 and the pixel elevation offset information configured for each pixel of display object 302. As cursor 108 is moved over the book, the cursor can be adjusted to conform to the contours of the book thereby approximating real-life shadows.

In some implementations, a shadow generated for a display object can be adjusted based on input to the display object. For example, a shadow for cursor 108 can be generated as described above. A user can provide input to (or through) cursor 108. A user can perform a selection operation (e.g., a mouse click) to cause a display object below cursor 108 to be selected or otherwise manipulated. For example, display object 302 can present a contoured graphical user interface for an electronic book application that simulates an open book. Display object 302 can be configured to allow the user to turn a page of the book using cursor 108. The user can provide input to cursor 108 (e.g., a mouse click) as cursor 108 is positioned over display object 302 to cause turning of a page of the electronic book. In some implementations, the drop shadow associated with cursor 108 can be adjusted to simulate lowering the cursor to the surface of display object 302. For example, the elevation of cursor 108 can be adjusted until the elevation of cursor 108 is substantially the same as the elevation of display object 302. The drop shadow associated with cursor 108 can be adjusted according to the change in elevation of cursor 108. Thus, the cursors drop shadow will be animated to move closer to the cursor until it appears under the cursor or disappears when the cursor appears to touch the surface of display object 302 (e.g., the cursor has substantially the same elevation as the surface of display object 302, including elevation offset if any).

Figure 5:
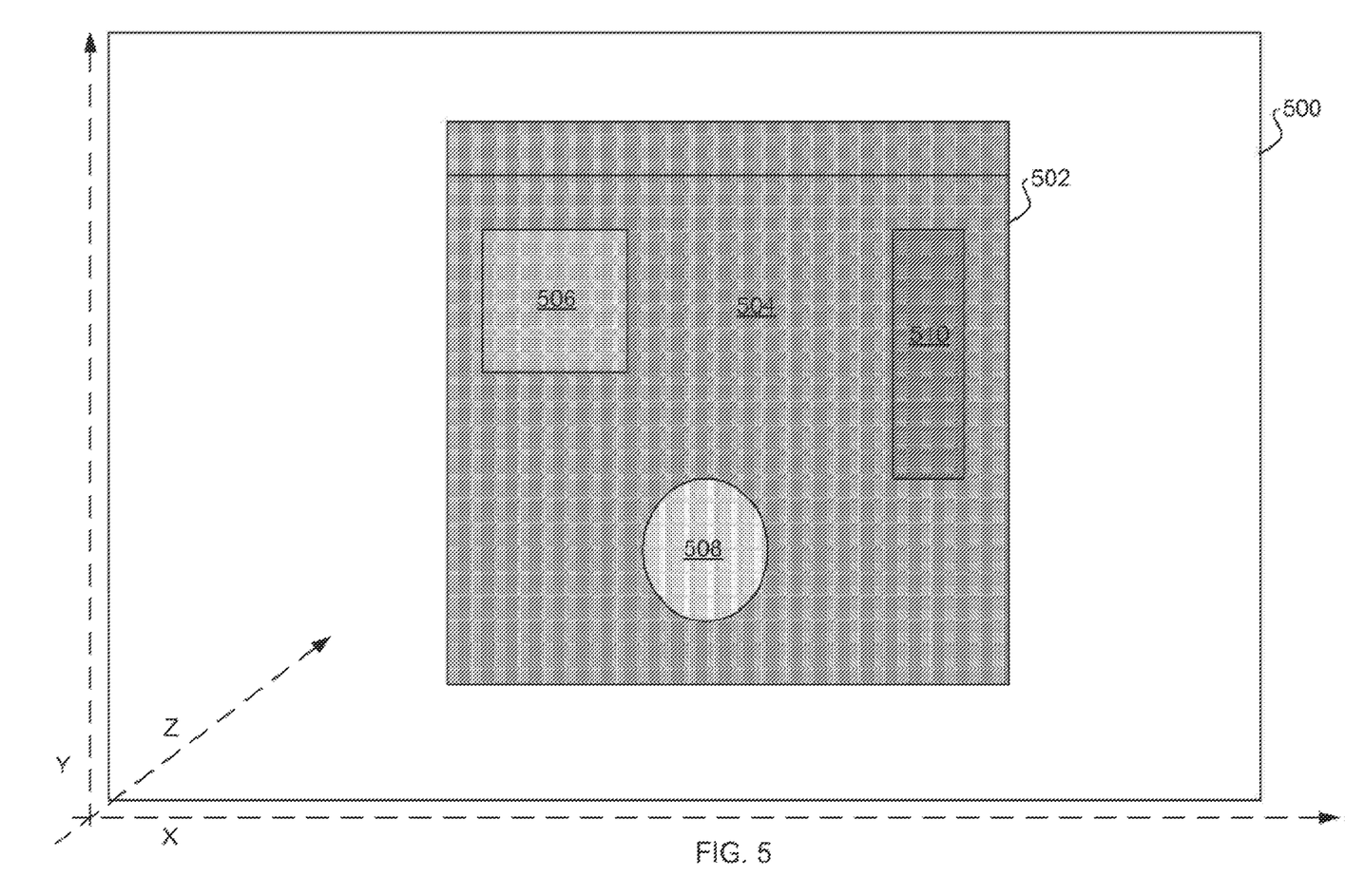
FIG. 5 illustrates an example graphical user interface editor that provides a pixel elevation map.

FIG. 5 illustrates an example graphical user interface editor 500 that provides a configurable pixel elevation map. In some implementations, a graphical user interface editor 500 can allow a user interface developer to specify elevation offset information for graphical user interface elements and display objects. For example, a developer can design application graphical user interface 502. The application GUI 502 can include a background area 504 and graphical elements 506, 508 and 510. For example, graphical elements 506, 508 and 510 can be images, buttons, menus or any other graphical element that can be included in a graphical user interface. GUI 502 can be a full color interface.

In some implementations, the developer can invoke a gray-scale bitmap display of the graphical user interface 502. The gray-scale bitmap display can be a gray-scale representation of full color GUI 502 that indicates the elevations of the pixels of GUI 502. For example, the gray-scale value (e.g., intensity level) of a pixel can represent to the elevation of the pixel. In some implementations, intensity levels correspond to a range between black (e.g., total absence of luminance) and white (e.g., total presence of luminance) and can be represented as a percentage (0-100%), an integer value (e.g, 0-255 if 8 bits are used per pixel), or any other representation. In some implementations, black can represent a zero elevation (or maximum elevation) while white can represent a maximum elevation (or minimum elevation). Gray values between black and white can correspond to elevations between zero and the maximum elevation.

In some implementations, a developer can adjust the pixels of the gray-scale bitmap display to assign elevation offset values to the pixels of graphical user interface 502. For example, a developer can change the gray-scale value of a pixel to cause a corresponding change in elevation of the pixel. A developer can change the gray-scale value of a pixel using any bitmap editing technique (e.g., line drawing, area filling, etc.). For example, a developer can select display element 506 and provide input to the graphical user interface editor indicating a gray-scale fill of 45% intensity for the display element.

Figure 6:
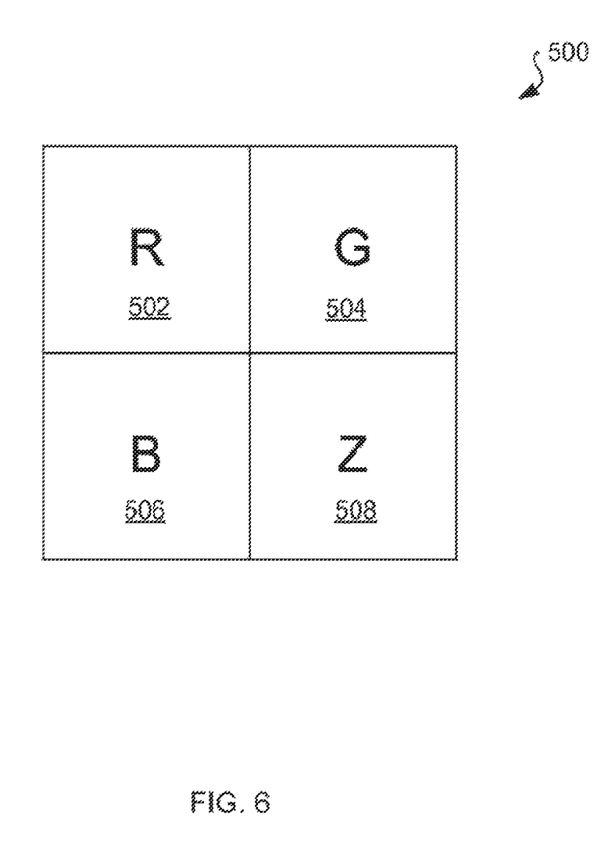
FIG. 6 illustrates an example of pixel color data that includes elevation offset information.

FIG. 6 illustrates an example of pixel color data 500 that includes elevation offset information. In some implementations, once the elevation offsets (e.g., gray-scale values) are assigned to the pixels of GUI 502, the elevation offsets can be stored with the pixel color data 500. The pixel color data can be stored in a number of bits (e.g., 8 bit, 16 bits, 32 bits, etc.) that can be used to store color data for a pixel. For example, when the full color GUI 502 is generated, color data for each pixel of GUI 502 can be stored in a 32 bit word, where 24 bits are used for red 502 (8 bits), green 504 (8 bits) and blue 506 (8 bits) (RGB) color data. The remaining 8 bits (Z 508), of the 32 bit word can be used to store elevation information for the pixel. For example, the gray-scale value of the pixel corresponding to the elevation can be stored in the remaining 8 bits. In some implementations, pixel elevation offset information can be stored separately from pixel color data.

In some implementations, when GUI 502 is rendered on a display screen, the pixel color data (R 502, G 504, B 506) can be used to render a full color display of GUI 502. In some implementations, when shadows and/or other three-dimensional effects are rendered on the display screen, the pixel elevation offset information (Z 508) can be used to render the shadows and three-dimensional effects. Thus, every pixel of a graphical user interface can be configured with elevation offset information thereby allowing graphical user interfaces to be configured with contoured and/or textured three dimensional surfaces. This pixel elevation data can be used to render dynamic shadows that can simulate or approximate real-life shadows.

Example Processes

Figure 7:
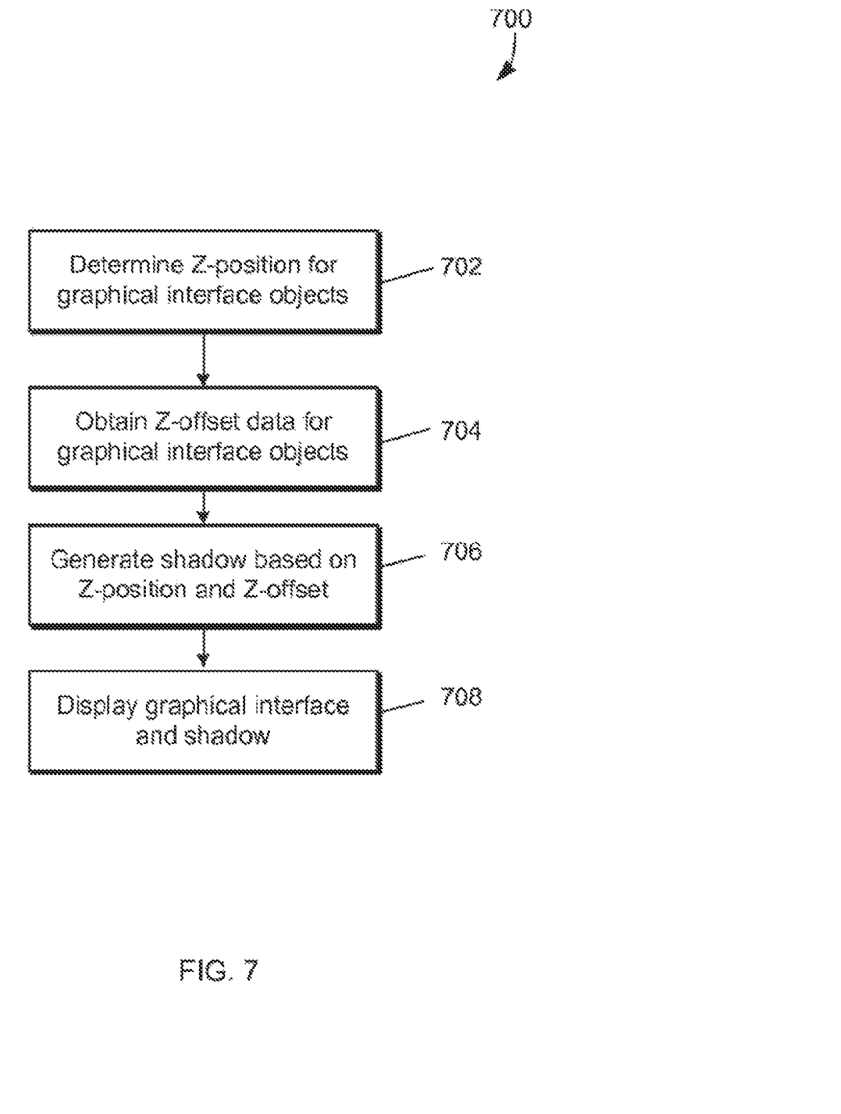
FIG. 7 is a flow diagram of an example process for generating dynamic shadows for display objects.

FIG. 7 is flow diagram of an example process 700 for generating dynamic shadows for display objects. In some implementations, shadows can be dynamically generated based on elevations calculated for display objects and pixel elevation offset information for pixels of display objects. For example, the pixel elevation offsets can be added to the elevation of the display object to provide for contoured, textured and/or undulating surfaces on a display object. Shadows generated on the display object can be dynamically adjusted to reflect or represent the contoured, textured and/or undulating surfaces of the display object according to the pixel elevation offset information.

At step 702, elevations (e.g., Z-axis positions, coordinates, values, etc.) for graphical user interface objects can be determined. For example, elevations of windows, cursors, icons and/or other user interface display objects can be determined. In some implementations, the elevation of a display object can be determined relative to other display objects. For example, if graphical objects displayed on a user interface are managed in a list, array, or other collection data type, the display objects can be spaced in elevation based on the display objects' position in the list, as described above with reference to FIG. 2.

At step 704, pixel elevation offset information for the graphical user interface objects can be obtained. In some implementations, graphical display objects can be configured with pixel elevation offset information. For example, a user interface developer can generate display object (e.g., a window, application user interface, icon, etc.) and configure the display object with pixel elevation offset information to give the surface of the display object texture, contours, undulations and/or other surface characteristics. In some implementations, by configuring a display object with pixel elevation offset information, the user interface developer can take an otherwise flat display object and give the display object a three-dimensional look and feel. In some implementations, each pixel of a display object can be individually configured with pixel elevation offset information. Once the display object has been configured with pixel elevation offset information, the pixel elevation offset information can be accessed and used to render the display object and shadows.

At step 706, shadows can be generated based on the elevation and pixel elevation offset information for the display objects. In some implementations, pixel elevation can be calculated based on the elevation of the object associated with the pixel and the elevation offset configured for the pixel. For example, if a pixel of a display object has an elevation offset of five (5) and the display object has an elevation of forty (40), then the elevation of the pixel can be calculated to be forty-five (45).

Once the pixel elevations have been calculated, the pixel elevations can be used to generate dynamic shadows. For example, a consolidated elevation bitmap (e.g., an elevation bitmap used for rendering the display) can be generated which includes pixels of each display object having the highest elevation above the desktop based on the calculated pixel elevations. For example, multiple display objects can overlap and therefore the overlapping objects can have pixels with the same coordinates (e.g., X,Y coordinates). However, each of the overlapping pixels can have a different elevation (Z value/coordinate, elevation, etc.). In some implementations, only the pixels having the highest elevation will be included in the consolidated elevation bitmap.

In some implementations, shadows can be generated using a graphics processing unit (GPU) filter which determines the amount of shadowing on a per-pixel basis. For example, by searching the consolidated elevation map, the filter can determine if a given pixel at one elevation is shadowed by a pixel at a higher elevation. If the pixel is shadowed, the GPU can calculate an intensity value based on the relative distances between the two pixels. The intensity value can then be used to modulate both the shadow's opacity and blur radius so that shadows falling onto pixels that are close in elevation are sharper, while shadows falling onto pixels that are farther apart are more diffuse.

At step 708, the graphical user interface, including display objects and shadows, can be displayed. For example, a graphics processing unit of a computing device can render the user interface, including windows, cursors, icons, other display objects and their shadows on a display device.

Figure 8:
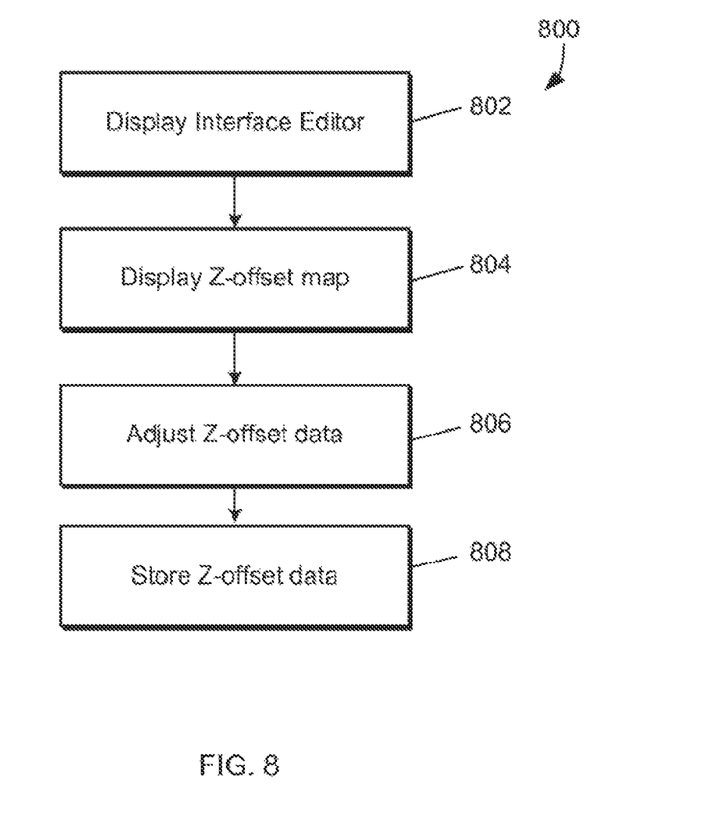
FIG. 8 is a flow diagram of an example process for configuring pixel depth offsets.

FIG. 8 is a flow diagram of an example process 800 for configuring pixel elevation offsets for display objects. In some implementations, pixel elevation offset information for display objects can be configured by editing a gray-scale bitmap corresponding to a display object.

At step 802, a graphical user interface editor can be displayed. In some implementations, the graphical user interface editor can be used by a user interface developer to generate graphical user interface elements (e.g., application graphical user interfaces.) The graphical user interface editor can present a full color display of a graphical user interface under construction.

At step 804, a pixel elevation offset bitmap can be displayed. In some implementations, a user can provide input (e.g., to a menu item or tool bar) to the graphical user interface editor to cause the editor to display an elevation map associated with a graphical user interface. For example, a gray-scale elevation bitmap image of the graphical user interface can be displayed. The intensity of each pixel of the bitmap can represent an elevation associated with the pixel. For example, if black corresponds to zero elevation and white corresponds to a maximum elevation, then a gray pixel is a pixel that has an elevation between zero (black) and the maximum (white) elevation. In some implementations, each pixel of a display object can have a default elevation of zero. However, if the pixels of a display object have been configured with an elevation value, then the pixels of the gray-scale bitmap will reflect the elevation configured for the pixel (e.g., the pixel will display black, white, or gray based on the configured elevation).

At step 806, pixel elevation offset information can be adjusted by modifying the pixel elevation offset bitmap. In some implementations, the graphical user interface developer can edit the gray-scale elevation bitmap. For example, the developer can edit the bitmap to change the intensity of the pixels. Editing of the bitmap can be performed using known bitmap editing techniques. For example, the bitmap can be editing using a bitmap editor that allows for filling bitmap regions, drawing lines, and other bitmap image editing functions.

At step 808, the pixel elevation offset information can be stored. In some implementations, the pixel elevation offset information can be stored with the pixel color data for the display object. For example, elevation data for a pixel can be stored in the same data structure that is used to store color data for the pixel, as described with reference to FIG. 6.

Example System Architecture

Figure 9:
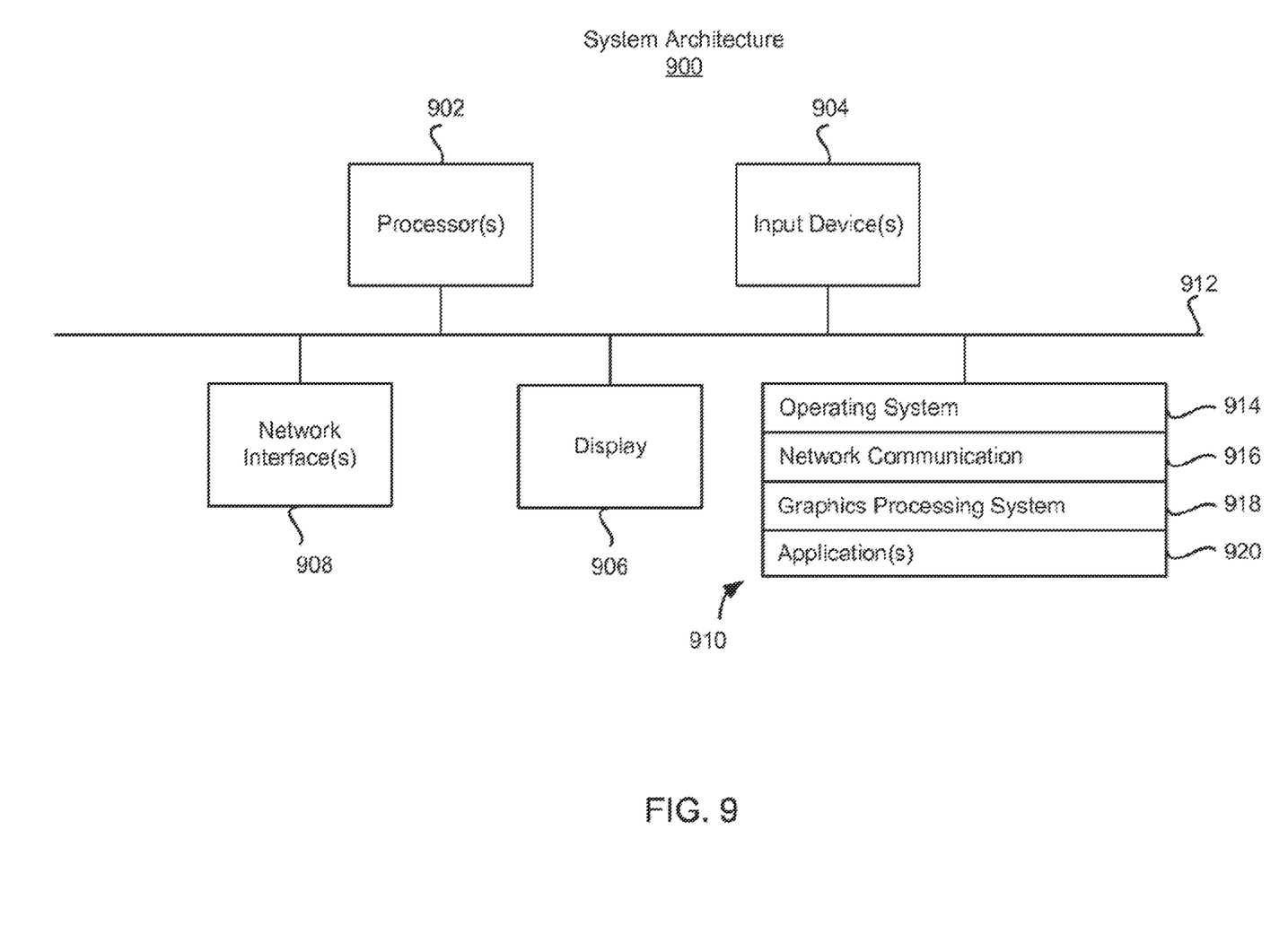
FIG. 9 is a block diagram of an exemplary system architecture implementing the features and processes of FIGS. 1-8.

FIG. 9 is a block diagram of an exemplary system architecture implementing the features and processes of FIGS. 1-8. The architecture 900 can be implemented on any electronic device that runs software applications derived from compiled instructions, including without limitation personal computers, servers, smart phones, media players, electronic tablets, game consoles, email devices, etc. In some implementations, the architecture 900 can include one or more processors 902, one or more input devices 904, one or more display devices 906, one or more network interfaces 908 and one or more computer-readable mediums 910. Each of these components can be coupled by bus 912.

Display device 906 can be any known display technology, including but not limited to display devices using Liquid Crystal Display (LCD) or Light Emitting Diode (LED) technology. Processor(s) 902 can use any known processor technology, including but are not limited to graphics processors and multi-core processors. Input device 904 can be any known input device technology, including but not limited to a keyboard (including a virtual keyboard), mouse, track ball, and touch-sensitive pad or display. Bus 912 can be any known internal or external bus technology, including but not limited to ISA, EISA, PCI, PCI Express, NuBus, USB, Serial ATA or FireWire. Computer-readable medium 910 can be any medium that participates in providing instructions to processor(s) 902 for execution, including without limitation, non-volatile storage media (e.g., optical disks, magnetic disks, flash drives, etc.) or volatile media (e.g., SDRAM, ROM, etc.).

Computer-readable medium 910 can include various instructions for implementing an operating system 914 (e.g., Mac OS®, Windows®, Linux). The operating system can be multi-user, multiprocessing, multitasking, multithreading, real-time and the like. The operating system performs basic tasks, including but not limited to: recognizing input from input device 904; sending output to display device 906; keeping track of files and directories on computer-readable medium 910; controlling peripheral devices (e.g., disk drives, printers, etc.) which can be controlled directly or through an I/O controller; and managing traffic on bus 912. Network communications instructions 916 can establish and maintain network connections (e.g., software for implementing communication protocols, such as TCP/IP, HT P, Ethernet, etc.).

A graphics processing system 918 can include instructions that provide graphics and image processing capabilities. For example, the graphics processing system 918 can implement dynamic graphical interface shadowing as described with reference to FIGS. 1-8. Application(s) 920 can be an application that is configured to support dynamic graphical interface shadowing or uses or implements the processes described in reference to FIGS. 1-8. For example, graphical user interfaces associated with application(s) 920 can be configured with pixel elevation offset information that allows for simulating shadows in a more life-like manner. Dynamic graphical interface shadowing can also be implemented in operating system 914.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
at an electronic device that is in communication with a display and one or more input devices:
concurrently displaying a plurality of user interface objects on the display, wherein:
the plurality of user interface objects includes a first user interface object and a second user interface object;
the first user interface object has a first elevation in the user interface;
the second user interface object has a second elevation, different from the first elevation, in the user interface;
the first user interface object is associated with first elevation offset information that specifies an elevation offset for a first portion of the first user interface object and an elevation offset for a second portion of the first user interface object that is different from the elevation offset for the first portion of the first user interface object; and
the second user interface object is associated with second elevation offset information, different from the first elevation offset information, that specifies an elevation offset for a first portion of the second user interface object and an elevation offset for a second portion of the second user interface object that is different from the elevation offset for the first portion of the second user interface object;
while concurrently displaying the plurality of user interface objects, detecting an input corresponding to movement across the first user interface object and across the second user interface object; and
in response to detecting the input:
while the input is at a location that corresponds to the first user interface object, displaying, on the first user interface object a visual indication that the input is at the location that corresponds to the first user interface object, wherein a visual representation of elevation of at least a portion of the visual indication changes as the movement progresses across the first user interface object based on one or more elements that extend out of a plane of the first user interface object as defined based on the first offset information; and
while the input is at a location that corresponds to the second user interface object, displaying, on the second user interface object a visual indication that the input is at the location that corresponds to the second user interface object, wherein a visual representation of elevation of at least a portion of the visual indication changes as the movement progresses across the second user interface object based on one or more elements that extend out of a plane of the second user interface object as defined based on the second offset information.

2. The method of claim 1, further comprising:
detecting a selection input while the input is at the location that corresponds to the first user interface object; and
in response to the selection input, changing the visual indication that the input is at the location that corresponds to the first user interface object.

3. The method of claim 1, wherein a first element of the one or more elements that extend out of the plane of the first user interface object corresponds to the first portion of the first user interface object and extends out of the plane of the first user interface object defined by the elevation offset for the first portion of the first user interface object.

4. The method of claim 1, wherein displaying the visual indication that the input is at the location that corresponds to the first user interface object comprises displaying a shadow on the display corresponding to the first user interface object.

5. The method of claim 4, wherein displaying the visual indication that the input is at the location that corresponds to the first user interface object further comprises changing an opacity of the shadow associated with the first user interface object as the movement progresses based on the first offset information.

6. The method of claim 4, wherein displaying the visual indication that the input is at the location that corresponds to the first user interface object further comprises changing a blur radius of the shadow associated with the first user interface object as the movement progresses based on the first offset information.

7. The method of claim 1, wherein the first user interface object comprises a first contoured surface and wherein the second user interface object comprises a second contoured surface.

8. The method of claim 1, wherein the first portion of the first user interface object includes a flat region with a first elevation value, and the second portion of the second user interface object includes a flat region with a second elevation value, different from the first elevation value.

9. The method of claim 1, wherein the plurality of user interface objects includes icons organized into an array on the display.

10. A non-transitory computer-readable medium including one or more sequences of instructions which, when executed by one or more processors, cause the one or more processors to perform a method comprising:
at an electronic device that is in communication with a display and one or more input devices:
concurrently displaying a plurality of user interface objects on the display, wherein:
the plurality of user interface objects includes a first user interface object and a second user interface object;
the first user interface object has a first elevation in the user interface;
the second user interface object has a second elevation, different from the first elevation, in the user interface;
the first user interface object is associated with first elevation offset information that specifies an elevation offset for a first portion of the first user interface object and an elevation offset for a second portion of the first user interface object that is different from the elevation offset for the first portion of the first user interface object; and
the second user interface object is associated with second elevation offset information, different from the first elevation offset information, that specifies an elevation offset for a first portion of the second user interface object and an elevation offset for a second portion of the second user interface object that is different from the elevation offset for the first portion of the second user interface object;
while concurrently displaying the plurality of user interface objects, detecting an input corresponding to movement across the first user interface object and across the second user interface object; and
in response to detecting the input:
while the input is at a location that corresponds to the first user interface object, displaying, on the first user interface object a visual indication that the input is at the location that corresponds to the first user interface object, wherein a visual representation of elevation of at least a portion of the visual indication changes as the movement progresses across the first user interface object based on one or more elements that extend out of a plane of the first user interface object as defined based on the first offset information; and
while the input is at a location that corresponds to the second user interface object, displaying, on the second user interface object a visual indication that the input is at the location that corresponds to the second user interface object, wherein a visual representation of elevation of at least a portion of the visual indication changes as the movement progresses across the second user interface object based on one or more elements that extend out of a plane of the second user interface object as defined based on the second offset information.

11. The non-transitory computer-readable medium of claim 10, the method further comprising:
detecting a selection input while the input is at the location that corresponds to the first user interface object; and
in response to the selection input, changing the visual indication that the input is at the location that corresponds to the first user interface object.

12. The non-transitory computer-readable medium of claim 10, wherein a first element of the one or more elements that extend out of the plane of the first user interface object corresponds to the first portion of the first user interface object and extends out of the plane of the first user interface object defined by the elevation offset for the first portion of the first user interface object.

13. The non-transitory computer-readable medium of claim 10, wherein displaying the visual indication that the input is at the location that corresponds to the first user interface object comprises displaying a shadow on the display corresponding to the first user interface object.

14. The non-transitory computer-readable medium of claim 13, wherein displaying the visual indication that the input is at the location that corresponds to the first user interface object further comprises changing an opacity of the shadow associated with the first user interface object as the movement progresses based on the first offset information.

15. The non-transitory computer-readable medium of claim 13, wherein displaying the visual indication that the input is at the location that corresponds to the first user interface object further comprises changing a blur radius of the shadow associated with the first user interface object as the movement progresses based on the first offset information.

16. The non-transitory computer-readable medium of claim 10, wherein the first user interface object comprises a first contoured surface and wherein to the second user interface object comprises a second contoured surface.

17. The non-transitory computer-readable medium of claim 10, wherein the first portion of the first user interface object includes a flat region with a first elevation value, and the second portion of the second user interface object includes a flat region with a second elevation value, different from the first elevation value.

18. The non-transitory computer-readable medium of claim 10, wherein the plurality of user interface objects includes icons organized into an array on the display.

19. An electronic device comprising:
one or more processors; and
a non-transitory computer-readable medium including one or more sequences of instructions which, when executed by the one or more processors, cause the one or more processors to perform a method comprising:
concurrently displaying a plurality of user interface objects on the display, wherein:

the plurality of user interface objects includes a first user interface object and a second user interface object;

the first user interface object has a first elevation in the user interface;

the second user interface object has a second elevation, different from the first elevation, in the user interface;

the first user interface object is associated with first elevation offset information that specifies an elevation offset for a first portion of the first user interface object and an elevation offset for a second portion of the first user interface object that is different from the elevation offset for the first portion of the first user interface object; and the second user interface object is associated with second elevation offset information, different from the first elevation offset information, that specifies an elevation offset for a first portion of the second user interface object and an elevation offset for a second portion of the second user interface object that is different from the elevation offset for the first portion of the second user interface object;

while concurrently displaying the plurality of user interface objects, detecting an input corresponding to movement across the first user interface object and across the second user interface object; and in response to detecting the input:
while the input is at a location that corresponds to the first user interface object, displaying, on the first user interface object a visual indication that the input is at the location that corresponds to the first user interface object, wherein a visual representation of elevation of at least a portion of the visual indication changes as the movement progresses across the first user interface object based on one or more elements that extend out of a plane of the first user interface object as defined based on the first offset information; and while the input is at a location that corresponds to the second user interface object, displaying, on the second user interface object a visual indication that the input is at the location that corresponds to the second user interface object, wherein a visual representation of elevation of at least a portion of the visual indication changes as the movement progresses across the second user interface object based on one or more elements that extend out of a plane of the second user interface object as defined based on the second offset information.

20. The electronic device of claim 19, the method further comprising:
detecting a selection input while the input is at the location that corresponds to the first user interface object; and
in response to the selection input, changing the visual indication that the input is at the location that corresponds to the first user interface object.

21. The electronic device of claim 19, wherein a first element of the one or more elements that extend out of the plane of the first user interface object corresponds to the first portion of the first user interface object and extends out of the plane of the first user interface object defined by the elevation offset for the first portion of the first user interface object.

22. The electronic device of claim 19, wherein displaying the visual indication that the input is at the location that corresponds to the first user interface object comprises displaying a shadow on the display corresponding to the first user interface object.

23. The electronic device of claim 22, wherein displaying the visual indication that the input is at the location that corresponds to the first user interface object further comprises changing an opacity of the shadow associated with the first user interface object as the movement progresses based on the first offset information.

24. The electronic device of claim 22, wherein displaying the visual indication that the input is at the location that corresponds to the first user interface object further comprises changing a blur radius of the shadow associated with the first user interface object as the movement progresses based on the first offset information.

25. The electronic device of claim 19, wherein the first user interface object comprises a first contoured surface and wherein to the second user interface object comprises a second contoured surface.

26. The electronic device of claim 19, wherein the first portion of the first user interface object includes a flat region with a first elevation value, and the second portion of the second user interface object includes a flat region with a second elevation value, different from the first elevation value.

27. The electronic device of claim 19, wherein the plurality of user interface objects includes icons organized into an array on the display.

* * * * *